United States Patent

Nagel et al.

[11] Patent Number: 5,889,472
[45] Date of Patent: Mar. 30, 1999

[54] ELECTRONIC VEHICLE KEY

[75] Inventors: Gerhard Nagel, Nufringen; Jürgen Setzer, Illingen; Volker Wilhelmi, Esslingen, all of Germany

[73] Assignee: Mercedes-Benz AG, Germany

[21] Appl. No.: 626,942

[22] Filed: Apr. 3, 1996

[30] Foreign Application Priority Data

Apr. 10, 1995 [DE]  Germany .................. 195 13 498.2

[51] Int. Cl.⁶ .................................................. H04Q 1/00
[52] U.S. Cl. .................. 340/825.31; 340/825.34; 340/825.44; 340/825.69; 340/825.72; 340/426; 340/474
[58] Field of Search .................. 340/825.31, 825.34, 340/825.44, 825.69, 825.72, 460, 474, 504; 235/380, 382, 382.5; 395/2.09, 2.1, 2.67; 364/424.04

[56] References Cited

U.S. PATENT DOCUMENTS 5,278,547  1/1994  Suman et al. ............. 340/825.32
5,596,317  1/1997  Brinkmeyer et al. ...... 340/825.31

FOREIGN PATENT DOCUMENTS 0 617 183   9/1994   European Pat. Off. .
34 06 746   8/1985   Germany .
37 02 331   8/1988   Germany .
39 00 494   7/1990   Germany .
39 12 707   11/1990  Germany .
41 02 0202  8/1991   Germany .
2236354     3/1991   United Kingdom .

Primary Examiner—Michael Horabik
Assistant Examiner—Tonel Beaulieu
Attorney, Agent, or Firm—Evenson, McKeown, Edwards & Lenahan, P.L.L.C.

[57] ABSTRACT

A vehicle key with an installed electronic system is used, for example, for wireless communication with the vehicle for controlling a vehicle locking system or a drive-away blocking system. The electronic vehicle key has a voice memory, a voice output unit, a control unit with a voice system function a radio call receiving device, a radio call information output unit and a control unit. By means of the voice system function, for example, the parking site of a vehicle can be stored in the key and can be emitted again in voice form. A key equipped with the radio call receiving function permits the transmission of radio call messages to the owner of the key.

11 Claims, 3 Drawing Sheets

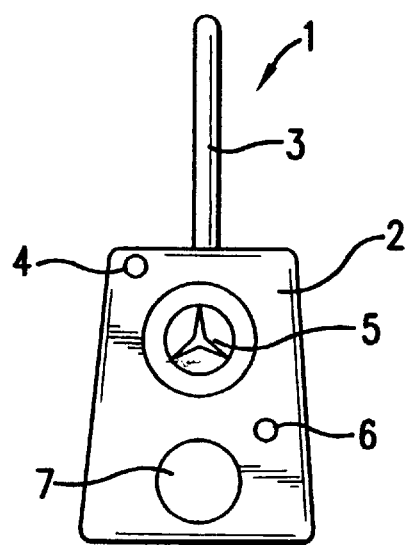
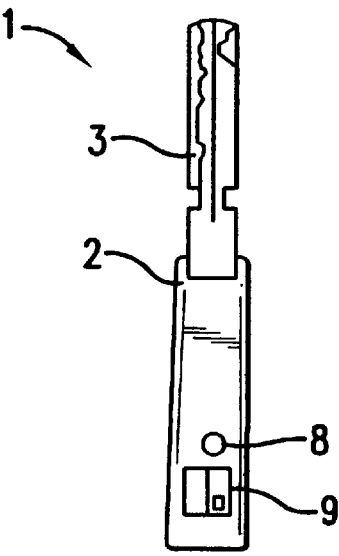
FIG. 1a  FIG. 1b
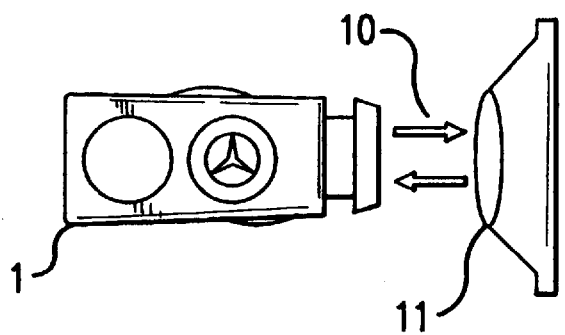
FIG. 2

ELECTRONIC VEHICLE KEY

BACKGROUND AND SUMMARY OF THE INVENTION

This invention relates to an electronic vehicle key. Such vehicle keys with electronic components frequently are provided to control a door locking device and/or a drive-away blocking device of the vehicle by means of wireless communication, for example, by way of infrared data transmission. In addition, a key bit or shank is often integrated into the key for mechanical locking and unlocking of vehicle locks.

In modern locking systems and roll-away blocking devices of motor vehicles, a code-protected data signal is communicated between the electronic key and the vehicle for access or usage authorization for the vehicle. Such a system, is disclosed, for example, in German Patent Document DE-OS 39 00 494 A1, in which the bidirectional data communicated between the key and the vehicle includes, in addition to a code signal which controls an antitheft device, vehicle and/or user-specific data which are emitted by the vehicle and are stored in the key, where they can be recalled and transmitted to the vehicle for vehicle-specific and/or user-specific adjustment of operating elements.

German Patent Document DE-OS 34 06 746 A1 discloses an electronic vehicle key which transmits coded data to control the vehicle locking system by means of an access authorization test, with a microprocessor unit and a sound generator. The latter generates an acoustical signal indicating the reception of an acknowledgement of a match in the case of a testing of an emitted user code signal.

In German Patent Document DE-OS 41 02 020 A1, a vehicle key is equipped for a bidirectional information exchange with the vehicle to control locking and unlocking elements of the vehicle. In addition, it has a visual display unit which can visually display information transmitted by the vehicle concerning vehicle condition information, such as the condition of the vehicle doors, a driven kilometer distance, the filling level of the fuel tank and optionally other parameters, such as the clock time and the condition of the battery of the key.

In European Patent Document EP 0 617 183 A2, a key for a motor vehicle contains a voice memory, a microphone and a voice playback unit. Information, such as the number of a parking space in which the vehicle is parked, may be entered in voice form into the key. This information is stored there, and can be emitted again from the key in voice form, upon request by the user.

A safety device for doors, gates and the like disclosed in German Patent Document DE-OS 37 02 331 A1 has an electro-mechanical lock with a keyboard and a control device. When a numerical code entered by way of the keyboard, corresponds to a code stored in the control device, the lock opens. If an unauthorized opening of the lock is attempted, an alarm signal is emitted; the control device then dials a stored telephone number and sends out a stored message. For this purpose, it has a dialing device for telephone networks and a text storage device. In this manner the called person can be informed of the unauthorized opening of the lock.

German Patent Document DE 39 12 707 C1, discloses a device having a receiver which is fixedly arranged in a vehicle and can receive signals that are transmitted in a wireless manner by a stationary object. A detector is connected to an output of the receiver, to which detector an element is connected which is arranged in or on the vehicle, such as an electromagnetically operable key bolt for the rear door of the vehicle. The signals emitted by the object, such as radio signals, contain information on a location-bound destination position. After reception of the signals in the vehicle, the element arranged there is activated and, in this manner, a destination-position-related control operation is triggered.

One object of the invention is to provide an electronic vehicle key which, in addition to its vehicle access or vehicle usage authorization function, offers expanded communication possibilities, including the capability of emitting information, particularly in voice form, received by way of a wireless communication path.

This and other objects and advantages are achieved by the electronic vehicle key according to the invention, which permits a voice output of information previously filed in the key; for example, vehicle-specific data, such as tank filling level, mileage, or information concerning the location of the previously parked vehicle. For this purpose, the control unit equipped with a voice system function controls the voice memory and the voice output unit in a suitable manner. The manner in which the key is supplied with voice information to be emitted may be selected for the particular application. For this purpose, the key is equipped in an appropriate manner. The vehicle-specific data can be transmitted from the vehicle to the key by way of a wireless transmission path, received there by the key receiver, and called up from the key in voice form.

An advantageous embodiment of the invention offers expanded communication possibilities by means of its capability of receiving radio calls. The received radio call information can be emitted again by the key, by way of a corresponding output unit. Such radio calls are sent by way of known telecommunication terminals, such as telephones, telexes, teletexes or video screen texts, to a receiver which can be addressed by way of a radio call number, but momentarily cannot be reached by way of such a telecommunication terminal. The radio call information may, for example, contain a call-back number via which a person receiving the radio call can then call back the person sending the radio call via the normal telecommunication network. For this purpose, so-called sound-only radio call receivers exist which have up to four radio call numbers as well as numerical radio call receivers which have a radio call number for a numerical control and up to two numbers for a sound-only information. Miniaturized radio call receiver units are known which are suitable for a vehicle key and have up to now been integrated, for example, as an additional function in wrist watches.

By means of a further embodiment of the invention, it is possible to enter the information into the key in voice form, where it is stored in a voice memory, for later play back in voice form.

In yet another embodiment of the invention, the radio call receiving function is combined with the voice system function. This arrangement has the advantage that the reception of a radio call message is indicated by a signal sound; also a call-back number which may be contained in the radio call message can be called up in voice form from the key.

Still another embodiment of the invention permits the transmission of radio call information received by the key, to the vehicle pertaining to the key, by way of a wireless data communication path which, in particular, may simultaneously be used as a communication path of a vehicle access authorization system or of a vehicle usage authorization system. A locking system and/or a drive-away blocking system of the vehicle are controlled by a coded data exchange between the key and the vehicle by way of this communication path, such as an infrared communication path. The radio call information may then be indicated in an indicating device in the vehicle or, in the case of a call-back number information, may be transmitted directly to a radio telephone existing in the vehicle.

Another embodiment of the invention provides increased protection from unauthorized vehicle use, for example, in modern vehicle protection systems. A drive-away blocking system is activated when a vehicle-side unit no longer receives usage release data which are otherwise transmitted at regular intervals from the key to the vehicle. The vehicle can therefore not be used without the key. As an additional safety measure, the output of release data by the key is coupled to the regular reception of usage releasing radio call information at certain specified time intervals. When the authorized person loses the key, he can terminate these radio call messages to the key maintaining the vehicle usage, after which the key will no longer send any usage release data to the vehicle, so that the drive-way blocking system is activated. An unauthorized person can therefore no longer use the vehicle, even when he also has the key.

Finally, a further embodiment of the invention is advantageous for vehicles which have a burglary—theft warning system. Although these conventional warning systems emit an alarm signal at the location of the vehicle, this signal may not be noticed or observed. Upon activation of the burglary-theft warning system, the radio telephone of the vehicle automatically sends a corresponding activating message as a radio call, which can be received by the key, which then emits a message warning the key to take corresponding measures.

Other objects, advantages and novel features of the present invention will become apparent from the following detailed description of the invention when considered in conjunction with the accompanying drawings.

BRIEF DESCRIPTION OF THE DRAWINGS

FIGS. 1a and 1b are front and side elevations of an electronic vehicle key with a voice system function according to the invention;

FIG. 2 is a schematic depiction of a bidirectional wireless data communication system between a vehicle mounted electronic ignition starting switch unit and a key with a voice system function belonging to the vehicle;

DETAILED DESCRIPTION OF THE DRAWINGS

Figure 3:
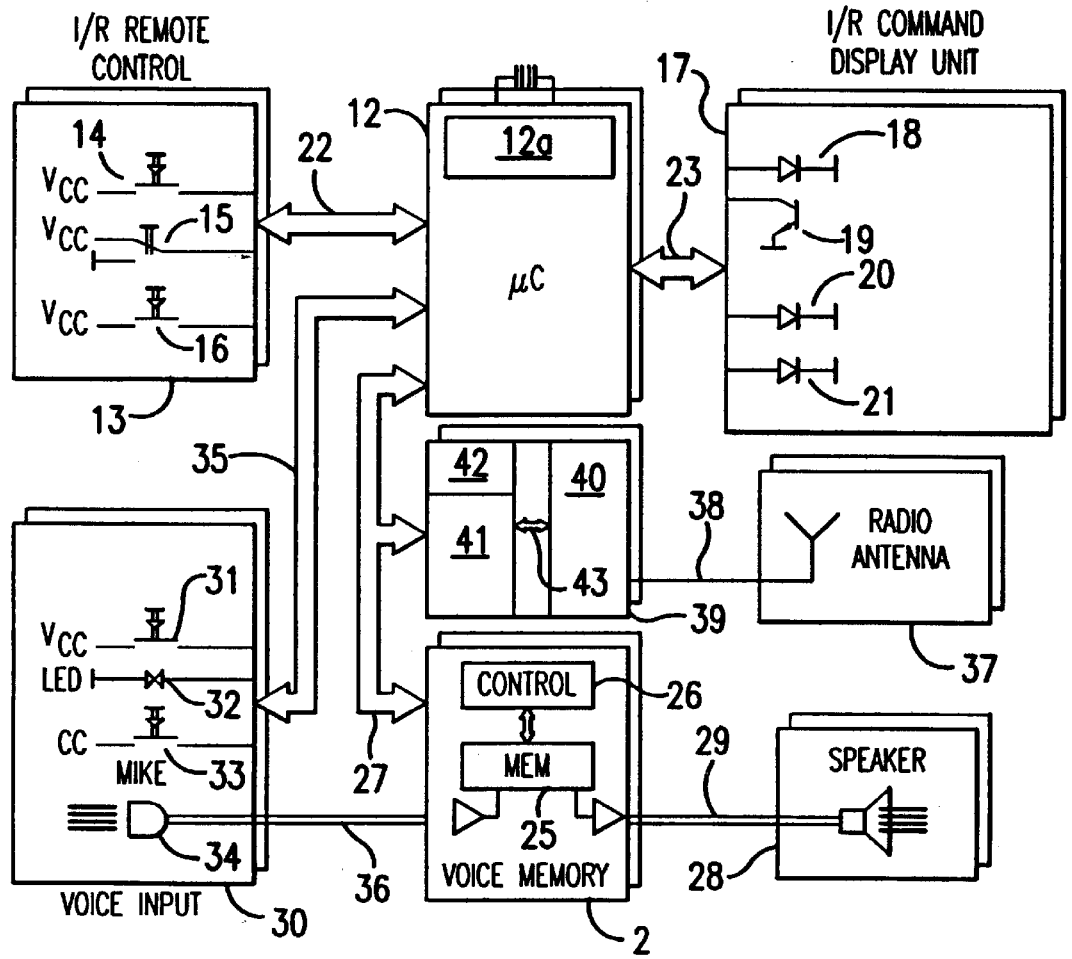
FIG. 3 is a block diagram of the electronic system of an electronic vehicle key with an infrared communication function, a radio call receiving function and a voice system function according to the invention.

The figures illustrate different applications of an electronic vehicle key 1 equipped with different communication devices, for which the precise electronic construction in the key 1 may be modified to accommodate the functions to be carried out. (For reasons of simplicity, the same reference number is always used for the key 1.) The key 1 illustrated in FIG. 1 has a housing 2 of the customary type from which a key bit 3 for mechanical actuation of the vehicle key locks, can be folded out and folded back by way of a corresponding unlocking push button 4. At the same time, by way of an infrared remote control push button 5, the key 1 offers the possibility of a user-code-secured control of the vehicle locking system by way of a bidirectional infrared data transmission path. Furthermore, the key 1 also has a voice system function with both voice output and input capability, that is activated by way of a corresponding triggering push button 6. A loudspeaker 7 is used as a voice output, and by way of an installed microphone 8, permits entry of voice information into the key 1. A switch-over device 9, controls switching between voice output and the voice input modes.

FIG. 2 illustrates the communication of an electronic vehicle key 1 such as that of FIG. 1 with the vehicle by way of a bidirectional infrared data transmission path 10. The vehicle mounted communication unit is integrated in a schematically illustrated electronic ignition starting switch unit 11.

FIG. 3 illustrates the electronic system of a key of the type shown in FIGS. 1 and 2. In addition to the voice system function and the capability of infrared(IR) communication with the pertaining vehicle, this key also has a radio call receiving function, which is controlled by a microcontroller 12 with an integrated EEPROM 12a. For the IR-communication function, an infrared remote control unit 13 and an IR-communication and display unit 17 are connected by way of respective bidirectional signal or data exchange lines 22, 23 with the microcontroller 12. The IR remote control unit 13 contains an IR remote control triggering switch 14, an operating-type switch-over device 15, and a switch 16 for control of an additional rear lid securing device. The IR communication and display unit 17 contains an IR transmitter 18, an IR receiver 19 as well as two light-emitting diode displays 20, 21 for conveying information concerning a vehicle condition report and concerning the condition of a current-supplying battery. By means of a conventional bidirectional infrared interface, not described here in detail, coded data are exchanged for manipulation-protected testing of the vehicle access authorization, in which the previously locked vehicle doors are unlocked only if a positive tests result is achieved. Furthermore, this IR communication system between the key and the vehicle can also transmit actual vehicle-specific data, such as tank filling level, mileage, etc. The data respectively loaded currently into the vehicle key may be recalled as required by the user, particularly outside the vehicle by way of the voice function described below. In addition, the IR communication path is used to transmit user-specific data previously stored in the vehicle key, to adjust vehicle mounted elements when the vehicle is started, so that the vehicle electronic system automatically brings the corresponding elements into the positions desired by the user. For example, the vehicle seat, mirrors and radio can be automatically adjusted to suit the user. These adjustments can also be detected at the end of a drive as current adjustments for the particular user of the vehicle, and stored in the key by way of the IR data transmission path.

The key also has a conventional voice memory module 2 with a memory unit 25 and a control unit 26 for the component and power supply control which is connected with the microcontroller 12 by way of a data exchange line 27 and controls the memory unit 25. A voice and signal output unit in the form of a loudspeaker 28 is connected to the voice storage module 2 by a connection line 29. An operating and voice input unit 30, which activates the voice system function and provides voice input, contains a voice input switch 31, a voice output switch 33 and a light-emitting diode display 32. These elements 31, 32, 33 are connected to the microcontroller 12 by a signal line connection 35, and a microphone 34 is connected with the input side of the voice storage module 2 by a transmission line 36.

The memory unit 25 of the voice storage module 2 is adapted to store voice entries of a duration of up to approximately 60 seconds entered by way of the microphone 34 after activation of the voice input push button 31. By activating the voice output push button 33, stored voice entries, controlled by the microcontroller 12 and the control unit 26 of the voice storage module 2 can then be read out of the memory unit 25 and emitted at the loudspeaker 28. In addition to use as a short-term memory for deadlines, addresses, shopping lists, etc., it is also possible, when leaving the vehicle, to store a description of the parking location of the vehicle as a voice entry. This can be extremely helpful in locating the vehicle, particularly in very large parking lots. When the voice output push button 33 is pushed again, the voice entry is emitted again. Furthermore, the electronic system of the key is designed so that, by means of the voice system function, the vehicle-specific data, such as the tank filling level and the mileage, supplied to the key by way of the IR communication path can be emitted in voice form by the loudspeaker 28. For this purpose, the memory unit 25 of the voice storage module 2 contains individually addressable memory cells for voice output of the numbers 0 to 9 in a memory area which cannot be overwritten. The microcontroller 12 scans the data which it receives, digit by digit and, through the connection line 27 and the control unit 26, accesses the corresponding memory cell of the memory unit 25 in the voice storage module 2 in order to emit the data through the loudspeaker 28. For the purpose of voice output, additional voice messages can be stored in the form of words in the voice storage module, as required.

As a further communication function, the key is also configured to receive radio call messages. For this purpose, it has a radio call receiving antenna 37 connected by a transmission line 38 to a decoder and receiver unit 39, as well as a radio call receiver unit 40, a radio call decoder unit 41 and an EEPROM 42. Radio calls are placed in a conventional manner by way of general telecommunication channels with terminals, such as telephones, video screen texts, telexes or teletexes in the form of sound-only messages, numerical messages or alpha-numerical messages. These channels can be used to reach a person who, although he carries the radio call receiver which corresponds to the dialed radio call number, momentarily cannot be contacted via a terminal of the normal telecommunication channel. Such radio call systems are in use, for example, under the trade names Scall, Cityruf and Euromessage.

Suitable radio call receiver components may now be produced in such a miniaturized form that they can be housed without difficulty in a vehicle key of a normal size. The radio call receiver and decoder units are coupled in communication with each other by a data exchange connection 43. The receiver part 40 receives the signals of the radio call antenna 37 and the decoder part 41 is connected by the data exchange line 27 with the microcontroller 12 and the voice storage module 2. The radio call decoder part 41 determines whether an address code word contained in a received radio call signal (and converted directly into a serial digital data stream) matches the code word filed in it. If so, the message following in the data stream is taken over and possibly intermediately stored in the EEPROM 42. These valid messages can then be transmitted and processed by way of a suitable interface.

For example, a radio call information signal may be emitted by the decoder part 41 to the microcontroller 12, from which it is sent via the transmitter 18 of the IR communication path, to the vehicle, where it can be processed and made available, for example, on a vehicle-wide CAN-bus. In addition, when the vehicle has a combination instrument constructed as a CAN-capable function node, it can be indicated there by way of a suitable display unit (such as a liquid-crystal display) that a new radio call message has been received. Also, its content, such as a call-back number, can be displayed. Furthermore, the key can also signal the reception of a radio call message by means of a simple audible signal via the loudspeaker 28.

If the radio call message contains a call-back number, it may be emitted in voice form. For this purpose, the memory area which cannot be overwritten in the memory unit 25 of the voice storage module 2 contains in addition to those data for the voice output of the numbers 0 to 9, individually addressable memory cells for the voice messages "call-back" as well as "end". The user can therefore have the call-back number indicated to him at the display of the vehicle, if, for this purpose, he has inserted the key into the ignition lock, or acoustically via the voice system function of the key. In this case, the microcontroller 12 scans the radio call message digit by digit and accesses the corresponding memory cells of the memory unit 25 in the voice storage module 2.

Figure 4:
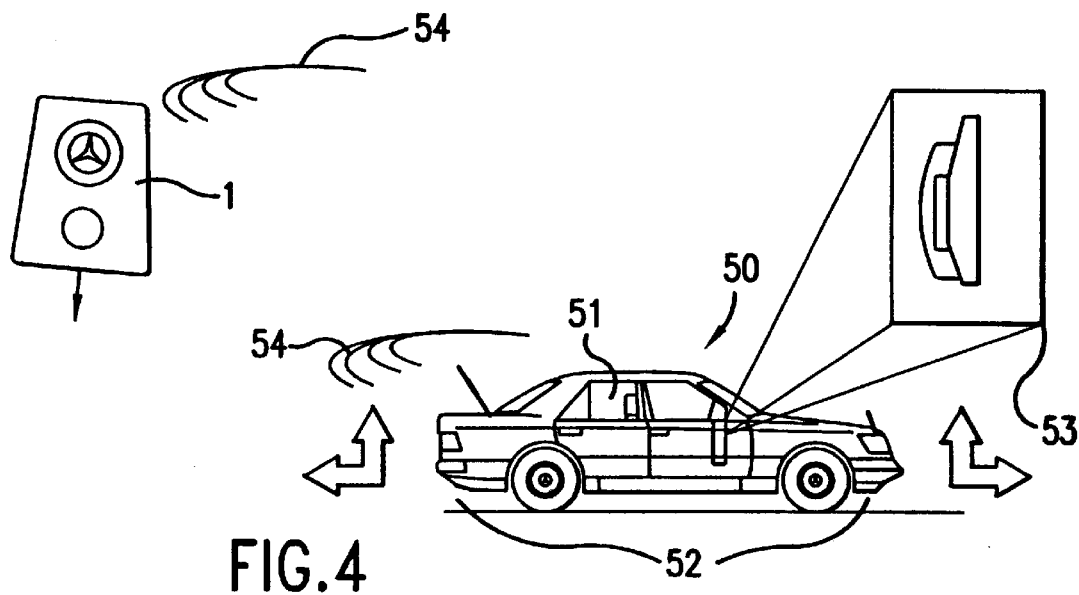
FIG. 4 is a schematic representation of radio call communication between a vehicle and a pertaining electronic key for reporting the activating of a burglary-theft warning system.
Figure 5:
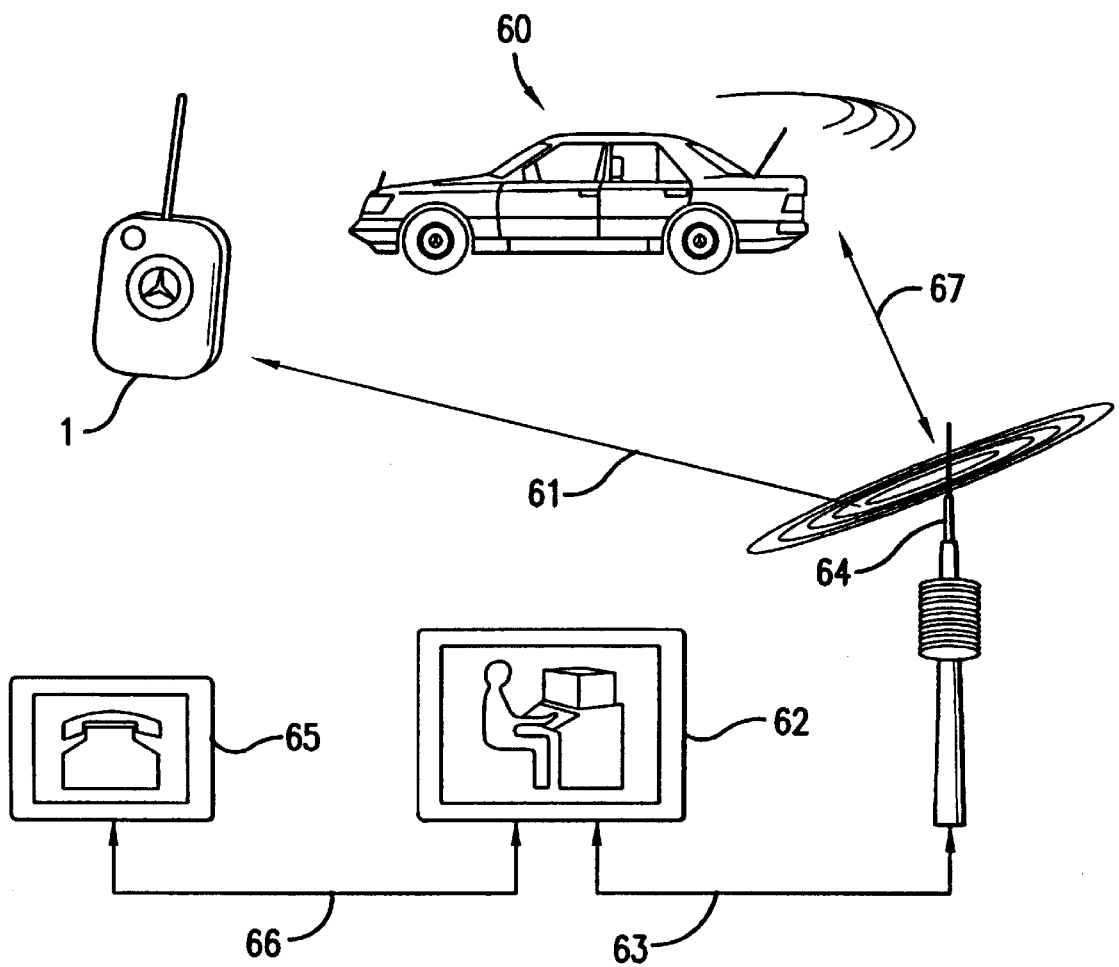
FIG. 5 is a schematic representation of a radio call communication system between a vehicle, a pertaining electronic vehicle key and the user for the control of a protecting device against outside usage.

FIGS. 4 and 5 illustrate two further possible applications of the additional radio call receiving function of the key 1, which provide an increased theft protection. FIG. 4 shows a vehicle 50 equipped with a burglary-theft warning system which contains an infrared interior monitoring system 51 and a front and rear end tow-away monitoring system 52, indicated by bent double arrows. In addition, the vehicle 50 has a radio telephone 53. When the burglary-theft warning system is activated, the vehicle electronic system automatically generates a radio call message 54 via the radio telephone 53 and beams it via the automobile antenna. The radio call message 54 is received by the radio call receiver of the electronic key 1, which triggers a characteristic acoustic alarm via the loudspeaker 28. In this manner, the key owner, who is frequently not in the proximity of the vehicle where the activated burglary-theft warning system generates an alarm, is informed of the activation of the warning system and can take suitable measures.

The system illustrated in FIG. 5 also offers increased protection against unauthorized usage. In this case, the key 1 communicates by way of a bidirectional IR data transmission path (not shown) with a drive-away blocking device mounted on the vehicle 60. In normal operation, the key 1 transmits a usage release code signal to the vehicle at predetermined time intervals, which prevents activation of the drive-away blocking system, and thus keeps the vehicle 60 in a ready condition. Thus, for an unauthorized usage of the vehicle 60, the key 1 is absolutely necessary. As a further safety measure, the key electronic system is designed such that the transmission of the IR release code signal is blocked when a radio call 61, which is normally transmitted at predetermined regular time intervals from a telecommunications center 62, is no longer received in the key 1. For this purpose, the telecommunication center 62, which is authorized for this purpose by the user, is connected with a radio call transmitter 64 by way of a leased line 63. This measure prevents that an unauthorized person from blocking a particular vehicle key by way of a telecommunication terminal, by dialing all theoretically possible radio call numbers.

When the vehicle owner notices the loss of his vehicle key 1, he can block this function by reporting the loss to the telecommunication center 62, for example, via a telephone 65 and a pertaining analog or ISDN-telephone network 66. The center 62 then terminates the transmission of radio calls for the key 1, so that the key 1 no longer sends of IR release code signals to the vehicle 60. Thus, in the event of a subsequent attempt to use the vehicle 60 by means of the key 1, the drive-away blocking system is activated, rendering the vehicle controls which are important for the driving operation (such as an engine timing unit) inoperative. In this manner, unauthorized use of the vehicle is prevented.

When ISDN-capable terminals are used, the center 62 can authenticate the caller. By granting corresponding authorizations, for example, by such an ISDN-authentication or by a personal code word, an unauthorized activation of the drive-away blocking system becomes highly unlikely.

As an alternative to periodic transmission of usage authorizing radio calls, the vehicle key 1 may maintain the transmission of IR release code signal to the vehicle 60 without the reception of radio calls 61, and terminating such transmission when a radio call is received containing a vehicle usage blocking information. In this case, the center 62 sends the corresponding radio call message when it has been ordered to do so by the vehicle owner because of the loss of the key.

In addition, in the system of FIG. 5, when a burglary-theft warning system existing in the vehicle 60 is activated, analogously to the case of FIG. 4, a radio call number is automatically dialed by way of an existing car telephone. A report is made to the authorized center 62 via a radio telephone network 67. The center then transmits this call to the vehicle owner and/or by interrupting usage authorizing radio calls or the transmission of a usage blocking radio calls to the key 1, prevents the further usage of the vehicle 60 by means of the key 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Electronic vehicle key comprising:

a voice memory;

a control unit with a voice system function;

a receiver for receiving vehicle condition data transmitted from the vehicle by way of a non-voice wireless transmission path; and a voice output unit for emitting as voice information, non-voice data received in the key from the vehicle via the wireless transmission path.

2. Electronic vehicle key according to claim 1, further comprising:

a voice input unit for inputting voice information into the voice memory.

3. Electronic vehicle key according to claim 1 further comprising:

a radio call receiver;

means for indicating a reception of a radio call message, by an acoustic signal sound.

4. Electronic vehicle key according to claim 1 wherein a call-back number contained in a received radio call message is emissible by way of the voice output unit controlled by the control unit in voice form.

5. Electronic vehicle key according to claim 3 wherein:

said receiver for receiving vehicle condition information is a first two way transmitter/receiver;

said radio call receiver is a second two way transmitter/receiver; and said vehicle key further comprises a communication path between said first and second two way transmitter/receivers for transmission of data to and from a remote station via said electronic vehicle key.

6. Electronic vehicle key according to claim 5 wherein said data comprise vehicle condition information.

7. Electronic vehicle key according to claim 5 wherein said data comprise actuation information for controlling a vehicle disabling device on said vehicle.

8. Electronic vehicle key according to claim 5 wherein said data comprise information from a theft prevention system on said vehicle.

9. Electronic vehicle key comprising:

a radio call receiving device;

a radio call information output unit for outputting received radio call information;

a control unit for controlling the radio call receiving device and the radio call information output unit; and a wireless non-voice data communication system between the key and the vehicle, including a wireless transmitter for transmitting to the vehicle information which is contained in received radio call messages.

10. Electronic vehicle key according to claim 9 wherein said vehicle has a drive-away blocking device, said electronic vehicle key further comprising:

means for transmitting at predetermined time intervals, by way of the wireless data communication system, usage release data which keep the drive-away blocking device deactivated, said transmitting of the usage release data being dependent upon periodic reception of usage-releasing radio call messages, and being terminated when the usage release data are no longer received.

11. Electronic vehicle key according to claim 9 wherein said vehicle has a burglary-theft warning system and a radio telephone, said electronic vehicle key further comprising:

means for receiving a radio call message automatically emitted by said radio telephone of the vehicle when the burglary-theft warning system is activated, which radio call message contains information concerning activation of the burglary-theft warning system; and means for emitting a warning report upon the reception of such a radio call message.

* * * * *